(12) United States Patent
Katta et al.

(10) Patent No.: US 7,856,370 B2
(45) Date of Patent: Dec. 21, 2010

(54) METHOD AND SYSTEM FOR DISPLAYING PREDICTIONS ON A SPATIAL MAP

(75) Inventors: Suresh Katta, Monte Sereno, CA (US); Haranath Gnana, Cupertino, CA (US)

(73) Assignee: Saama Technologies, Inc., Campbell, CA (US)

( * ) Notice: Subject to any disclaimer, the term of this patent is extended or adjusted under 35 U.S.C. 154(b) by 858 days.

(21) Appl. No.: 11/763,491

(22) Filed: Jun. 15, 2007

(65) Prior Publication Data

US 2008/0312942 A1    Dec. 18, 2008

(51) Int. Cl.
*G06F 17/00* (2006.01)

(52) U.S. Cl. .......................................................... 705/7
(58) Field of Classification Search ................. 705/7
See application file for complete search history.

(56) References Cited

U.S. PATENT DOCUMENTS

| | | | |
|---|---|---|---|
| 2003/0018584 A1 | 1/2003 | Cohen et al. | |
| 2003/0020739 A1 | 1/2003 | Cohen et al. | |
| 2004/0225432 A1* | 11/2004 | Pilley et al. | 701/117 |
| 2007/0143019 A1* | 6/2007 | Feyen et al. | 702/5 |
| 2008/0205768 A1* | 8/2008 | Srivastava | 382/206 |
| 2008/0208652 A1* | 8/2008 | Srivastava | 705/7 |

OTHER PUBLICATIONS http://www.zillow.com/search/Search.htm?addrstrthood=&citystatezip=94044&GOButton=%3CSPAN%3EGO%3C%2FSPAN%3E Sep. 18, 2007, p. 1.
http://www.zillow.com/HomeDetails.htm?zprop=15501677 Sep. 18, 2007, p. 2.
http://earth.google.com/earth4.html Sep. 18, 2007, p. 1-3.

* cited by examiner

*Primary Examiner*—Thomas Dixon
(74) *Attorney, Agent, or Firm*—Kevin H. Fortin

(57) ABSTRACT

A method and system for displaying predictions on a spatial map includes using a data analyzer for analyzing heterogeneous data having a spatial component to find utilizable data and using machine learning to automatically extract relationships from the utilizable data. The extracted relationships are used to make a prediction about at least one location on the spatial map and present that prediction in an oblique or perspective view. An interface presents the prediction on the spatial map in the form of a heat map overlying a 3-D topographical map. Although the 3-D map can be shown as any form of graphical projection including an oblique projection or orthographic projection, preferably a perspective view is used. It is also preferred that the graphical projection be interactive. The heat map may be 2-D or 3-D and be selectively displayed depending on the preference of a user.

19 Claims, 11 Drawing Sheets

METHOD AND SYSTEM FOR DISPLAYING PREDICTIONS ON A SPATIAL MAP

CROSS-REFERENCE TO RELATED APPLICATIONS

This application relates in subject mater to commonly owned U.S. patent application Ser. No. 11/710,093, filed Feb. 23, 2007.

FIELD OF THE INVENTION

The present invention pertains to systems and methods for making and displaying predictions on a spatial map.

BACKGROUND OF THE INVENTION

Predictions made in relation to a spatial map may be complex and include several variables. However, there are many business, municipal and investment decision-makers that would like to grasp valuable information from glancing at the output of predictive computing methods. For example, there is value in gaining insight into a particular geographical location for predicting optimal store, hospital, fire house, and other locations. There is also value in predicting localized real-estate value trends, predicting voter turnout in a political campaign, and gauging the expected efficacy of an advertising campaign.

In the past a data analyst had to investigate numerous sources of non-homogenous data. Intuition, in addition to analytical methods, has been used to arrive at predictions about any given geographical location. The resulting prediction may have been presented to decision-makers in the form a spreadsheet or compilation of computer print-outs. Some decision makers have, at times, been overwhelmed by the presentation of disparate data in a non-user friendly form. The inability of a decision-maker to quickly parse though numerous predictions could render such predictions virtually valueless.

SUMMARY OF THE INVENTION

The present invention seeks to aid decision-makers in reviewing data related to geographical locations by presenting the data in a user-friendly output format.

A method and system for displaying predictions on a spatial map includes using a data analyzer for analyzing heterogeneous data having spatial components to find utilizable data and using machine learning and other methods to automatically extract relationships from the utilizable data. The extracted relationships are used to make a prediction about at least one location on the spatial map, or to compare numerous locations. Comparison of locations is useful for optimization of location selection for particular purposes.

Two dimensional (2-D) or three dimensional (3-D) maps are used in accordance with the present invention. These maps can be topographical maps viewed in an interactive setting as a perspective view, for example. Traditional topographical maps display the current terrain features of a region and the graphic representation of the landform through the use of relief (3-D modeling) or through the use of topographical lines on a 2-D map. The present use of the term "topography" or "topographical" includes not only the physical shape of the geographical surface, but also any details that distinguish one place from another.

An interface presents the prediction on the spatial map in the form of a heat map in accordance with one aspect of the invention. The interface also displays the prediction on a topographical 3-D map in accordance with another aspect of the invention. Where the prediction varies with time, or where numerous predictions are to be presented, the invention enables simultaneously, selectively, or serially presenting more than one prediction.

BRIEF DESCRIPTION OF DRAWINGS

The invention may be better understood with reference to the detailed description in conjunction with the following figures where like numerals denote like elements, and in which.

DETAILED DESCRIPTION

Figure 1:
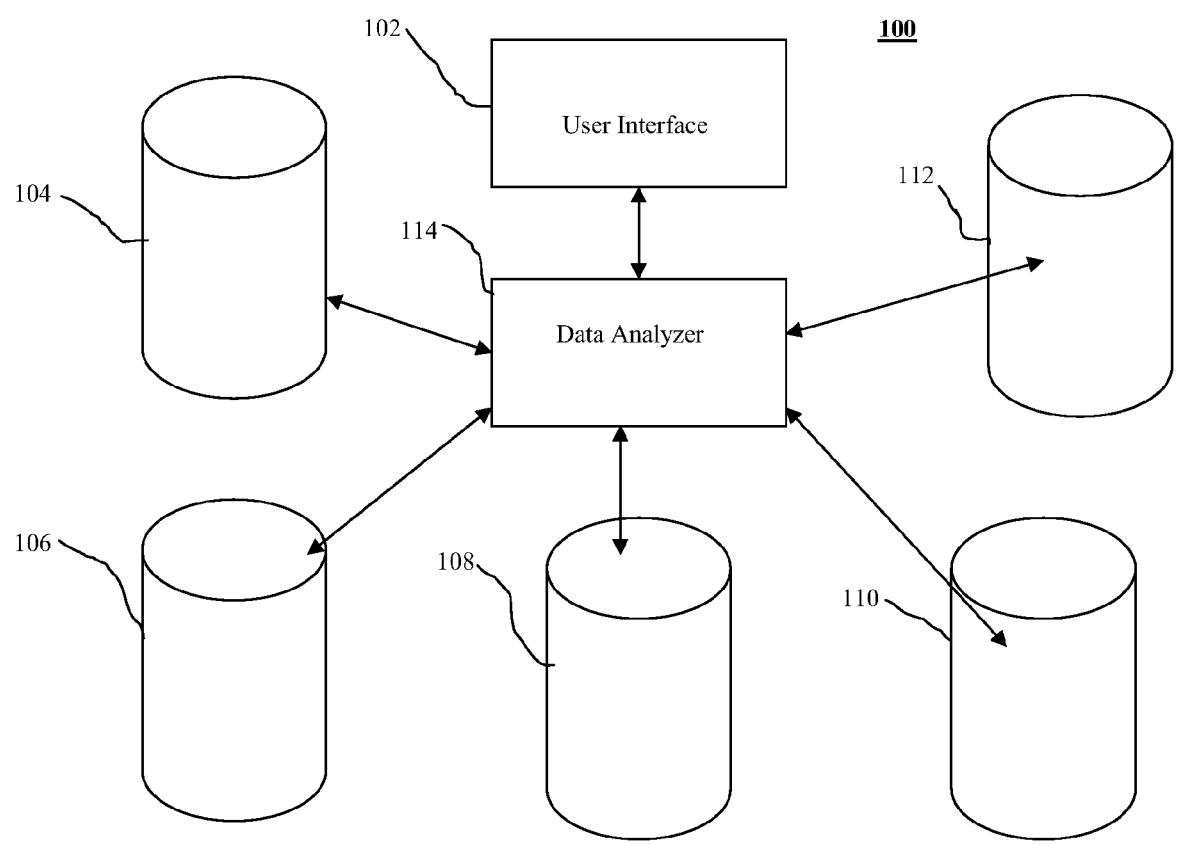
FIG. 1 is a system in accordance with the present invention.

FIG. 1 is a system 100 for optimizing business location selection. The system includes a user interface 102, heterogeneous databases 104, 106, 108, 110, and 112 and a data analyzer 114. The databases hold structured data, unstructured data, semi-structured data and spatial data. The interface is connected in communication with the data analyzer for displaying a three dimensional spatial map.

The data analyzer 114 includes a computer with programmed with software, which enables communication with the databases 104, 106, 108, 110, and 112 to analyze data integrity and data quality. The databases 104, 106, 108, 110, and 112, and the data contained therein are analyzed to find utilizable data. The analyzer 114, which includes a computer programmed with software, automatically extracts relationships from the utilizable data.

According to one aspect of the invention the system 100 includes a networked computing environment, which communicates with the various database 104, 106, 108, 110, and 112, and other databases and computing resources. The network may include a local network, a virtual private network, or a public network such as the Internet. In this way, the data analyzer 114 communicates with remote databases and remote computing resources to optimize analysis and processing of data.

The data analyzer 114 analyzes heterogeneous data from the databases 104, 106, 108, 110, and 112, and other databases, to make a prediction about at least one business location from the extracted relationships using a spatial grid. It can be appreciated that the data may have homogenous components that are also be analyzed. The methods of the present invention can be encoded in software or hardware used by the data analyzer 114.

The system 100 of the present invention automatically identifies and combines heterogeneous data sources to provide a rank-order list of possible locations in a spatial region. The data analyzer 114 creates and utilizes composite indicators, which are complex mathematical functions of the original input data. The composite indicators may be a function of input data having any of a number of heterogeneous forms. In an alternate embodiment, some of the composite indicators are pre-determined. People or machines may facilitate the pre-determination of a composite indicator. The system 100 employs appropriate dimensionality reduction techniques that are also an aspect of the invention to reduce mathematical burden.

Data Preparation

The databases 104, 106, 108 and 110 include original data sets that can be described in terms of four main types of data. The data types are heterogeneous and include structured data (in the form of tables), unstructured data (in the form of free-text narratives), semi-structured data, and also spatial data.

The data analyzer 114 analyzes each data type separately. It can be appreciated that the data may also be analyzed in combination with some other data set. According to one aspect of the invention the data analyzer 114 creates and utilizes composite indicators to summarize and transform the original data sets. The data analyzer 144 also filters and cleanses the original data sets in order to have the best output. The cleansing process employed by the data analyzer 114 includes removing outliers, identifying bad data that is not within normal bounds, and transforming selected bad data to within normal bounds.

Structured Data

The data analyzer 114 converts structured data into a flat table with rows and columns. Each row corresponds to an observation and each column corresponds to a measured variable. The observations preferably are independent and identically sampled observations from the population, but it can be appreciated that non-independent and non-identically sampled observations can also be converted into useful form.

The data analyzer 114 is configurable to convert observations relating to the demographics of customers in a region of interest (R) into rows on a flat table. The region of interest (R) is a set of connected polygons, but unconnected polygons can represent a region of interest on a map. Customer oriented structured data relevant to R (labeled C) is assumed to contain demographic and summarized purchase data of reasonable resolution. Location oriented structured data is assumed to be arranged where each observation corresponds to a location with the columns corresponding to the attributes of the location. These features can be assigned to a matrix L. Thus, fully structured data from of these types for the region R correspond to two rectangular matrices C and L.

The data analyzer 114 is also configurable to convert observations relating to the Traffic information and other attributes relevant to the locations stored in L so that these can be concatenated with the matrix L. We assume that the customer matrix is of size $(N_c \times p_c)$ and the location matrix is of size $(N_L \times p_L)$, where N corresponds to the number of customers (or locations) and p corresponds to the number of attributes for the customers (or locations). Note that the matrix corresponding to customers can correspond to existing customers, dormant customers, prospective customers, or an arbitrary population relevant to R.

Semi-Structured Data

The data analyzer 114 is configurable to convert semi-structured data into a useable flat table. Preferably, the data analyzer 114 uses XML protocols to handle semi-structured data.

In accordance with one embodiment of the present invention, relevant semi-structured data is coded into a similar flat matrix to C and L above, with the additional restriction that the integrity between semi-structured fields be preserved. Real-estate information, weather, selected traffic elements, and some location attributes are presented in a semi-structured format. The semi-structured location and customer tables are denoted as $S_L$ and $S_C$ respectively with appropriate sizing variables.

Unstructured Data

Unstructured data is available in many forms. News print, Internet textual publications, Internet images, television audio and video streams, satellite broadcasts, and radio broadcasts. In view of the limitations on computing power and network bandwidth, the presently most useful form of unstructured data is in the in the form of free-text narratives such as are available on the Internet, real-estate listings and venues such as Craigslist. These free-text narratives provide a wealth of valuable information. While free-text narratives are clearly recognized as providing a wealth of valuable information, it can be appreciated however, that as computing power and network bandwidth cease to be limitations, that speech and video can be directly utilized, or converted into intermediary form to be indirectly utilized, for the purposes of the present invention.

Given a corpus of $N_d$ documents, each document can be transformed in a vector space representation by creating a matrix of size $(N_d \times p_t)$, where $p_t$ equals the number of unique terms in the union of all terms that appear in the $N_d$ documents. An intermediary step may be required for audio and video streams so that the streams are digitized (as necessary), converted into ASCI or other textual representation, and analyzed. The dimensionality of the problem of utilizing free-text narratives is significant and even for relatively short documents, the matrix size may include parameters reflective of $N_d$=30,000 documents, $p_t$=40,000, or greater.

Thus, for customer and location information, assume that two matrices $U_c$ and $U_L$ are created, respectively. These matrices are massive, typically containing $O(10^8)$ elements and can often be handled efficiently with sparse matrix algorithms. The dimensionality of these matrices can be marginally reduced through the process of stemming, stop-word elimination, and elimination of infrequent terms. However, the assignment of a relevancy score to each attribute, and a composite score to each table can significantly aid in dimensionality reduction.

Spatial Data

Spatial data is stored in a spatial database and contains the relevant information about business locations in a 2 or 3 dimensional grid. The gridlines are arbitrary and can be at any resolution. A higher resolution grid yields a higher fidelity system. The data analyzer 114 includes a resource to cleanse, filter and prepare the spatial data, as the other data in the system, in order to generate the best possible predictions. The spatial database should accommodate the computation of relationships such as set oriented, topological, directional, metric, dynamic, and shape-based relationships. The statistical basis of the spatial analysis used in this system is on spatial autocorrelation.

Target Variables

Assuming that the relevant business has an existing set of stores or locations, each store can be assigned a figure of merit that indicates its relative value. For example, revenue, profitability, size, the so-called RFM score (recency, frequency, monetary) score can be assigned to each store. Other figures of merit relevant to business location selection can be chosen. Given the stores can be rank ordered using one of these scores or a combination of these scores (such as revenue/square foot). These scores can be formulated into a table Y, with $N_r$ rows and $p_y$ columns, each column corresponding to one of the above figures of merit.

Assigning a Relevancy Score

The data preparation steps described above can yield massive data sets. According to one embodiment of the invention, the matrices have $O(10^6)$ elements and $O(10^5)$ columns, or more. In order to reduce the dimensionality of the problem, several methods can be employed.

For example, suppose that a new matrix is created which an appropriate composition of (C, L, S). There are several key methods to reduce dimensionality.

Singular Value Decomposition (SVD) of the matrix X=U'DV, (where the indicates the transpose operator) reduces dimensionality. In this decomposition, D contains the singular values of the matrix X. We choose the first n components in the orthogonal matrix V and create a projection matrix $P=V_n X$. This creates a low dimensional linear representation of the original matrix X.

Information Gain Formulation: in this formulation $IG(y|x)=H(y)-H(y|x)$, where y is defined as a column in the target matrix Y, and x is a column in the input matrix X. The operator H(q) computes the Shannon entropy of the random variable q: $H(q)=-\int p(x) \log p(x)$, assuming q has density function p. This is an information theoretic quantity often used in the text mining community.

$$\text{Correlation } corr(y|x) = \frac{E(xy) - E(x)E(y)}{\sqrt{E(x^2) - E^2(x)} \sqrt{E(y^2) - E^2(y)}}.$$

Once these relevancy scores are measured for each variable in the table X, the columns in X can be rank ordered in terms of relevance. A pre-specified parameter w can be chosen so that only those columns in X, which have relevance greater than $w_r$, are retained. This typically reduces the dimensionality of the problem significantly, and can be controlled by the single parameter $w_r$. Given a set of tables $X_1, X_2, \ldots, X_k$, each table can be assigned a total relevancy to the prediction problem by taking a possibly weighted sum of the relevancy scores for each variable.

Other Measures of Relevancy

In the past, human experts have dominated the domain of business location selection. Accordingly, it is likely that a business would have experts that have their own opinions about the relative weighting of the attributes in question. Thus, we give them the ability to choose a set of weights w such that the variables are assigned either a relevancy proportional to w'X or w'IG(y|x), or w'corr(y|x).

Convex Combinations

For reasons of interpretability, in the event that expert weights are used, we restrict the weights to be such that w'l=1, w>0 for all elements of w, where l is the vector containing unity of appropriate length. This results in a convex combination of attributes, and leads to a simple way to interpret the weights as prior probabilities of the importance of each attribute.

Once the appropriate dimensionality reduction process is complete, we are left with a large input matrix X and an associated target vector (or matrix) Y. Our problem now is to learn the relationships between X (of size N×p) and Y (of size N×m) so that in the region of interest R, we can make predictions. Formally, we have a learning problem to estimate a function F such that $Y \approx F(X,\theta)$, where θ is a set of parameters corresponding to the coefficients and underlying structure of the model.

Modeling Methods Gaussian Process Regression

Several methods exist for learning F which corresponds to the best set of attributes that are predictive of an optimal store, as measured by the components of Y. These include a linear model, logistic regression, linear discriminant analysis, neural networks, decision trees, and Gaussian Process Regression. The latter method is preferable for various mathematical reasons described here. There are numerous references to the former methods, and they all suffer from a serious drawback: while they can make predictions, i.e., for a new input value, say $\tilde{X}$, they can emit $\hat{y}=F(\tilde{X},\theta)$, they generally do not directly provide an estimate of the certainty in the prediction. Thus, while a value is emitted, the user is not able to determine with what confidence that information is estimated to be correct. GPR, on the other hand, provides both a prediction and a measure of confidence in that prediction. A brief overview of Gaussian Process Regression is given here.

The Gaussian Process Regression (GPR) technique can be interpreted in a Bayesian context as one where a prior distribution is placed over the space of all possible values of F, such that those functions, which are considered more likely, are given higher weight. The function F is written as $F(x) \sim GP(m(x), k(x,x'))$ with the mean function m(x) generally taken to be zero. The covariance function k(x,x') measures the relationship between two inputs, x and x'. Several covariance (or kernel) functions can be used. For example, we use the squared exponential function $$k(x, x') = \exp\left(\frac{1}{2}|x - x'|^2\right)$$

which emphasizes inputs that are nearby in the input space, and de-emphasizes those that are far away. Once the covariance function is set, predictions can be made using the following governing equations:

$$\hat{y}=k^T(K+\sigma_n^2 I)^{-1}y,$$

$$V(\hat{y})=k(x,x)-k^T(K++\sigma_n^2 I)^{-1}k$$

These governing equations give the point estimate for y and the variance of that estimate in a mathematically principled way.

Other Modeling Methods

Support Vector Machines (SVMs) are related to Gaussian Processes and form a second potential method for predicting optimal store locations. The SVM performs regression by projecting the original data into a high, possibly infinite dimensional feature space. In this feature space, a linear model can be fit to the data, with the resulting fit being projected back into the original data space. Numerous studies have shown that this method works well at both regression and classification problems. The standard formulation for the SVM is as follows:

$$\text{Minimize} \|w\|^2/2 \text{ subject to}$$
$$x_i \cdot w + b \geq +1 \text{ for } y_i = +1$$
$$x_i \cdot w + b \leq -1 \text{ for } y_i = -1$$

where $\{(x_i,y_i) | i \in \{1, 2, \ldots, n\}\}$ is the set of n training examples where the $x_i$'s are the inputs and each $x_i \in R^d$, $y_i \in \{-1,+1\}$ (i.e., the two possible labels), w is the normal of the separating hyperplane, and b is an intercept term.

Slack variables $\xi_i, i \in \{1, 2, \ldots, n\}$ are introduced into the optimization problem as follows:

$$\text{Minimize} \|w\|^2/2 + C\sum_{i=1}^{n} \xi_i \text{ subject to}$$
$$x_i \cdot w + b \geq +1 - \xi_i \text{ for } y_i = +1$$
$$x_i \cdot w + b \leq -1 + \xi_i \text{ for } y_i = -1$$
$$\xi_i \geq 0 \forall i$$

C is a parameter chosen by the user which reflects how large a penalty should be assigned to the errors. The slack variable allows for a soft penalty for each example. The data can be mapped to an infinite dimensional space through the use of a kernel operator (as for the Gaussian Process). In this case, we convert the last optimization problem into its Wolfe dual:

$$\text{Maximize} \sum_{i=1}^{n} \alpha_i - \frac{1}{2} \sum_{i=1}^{n} \sum_{j=1}^{n} \alpha_i \alpha_j y_i y_j x_i \cdot x_j \text{ subject to}$$
$$0 \leq \alpha_i \leq C \forall i \in \{1, 2, \ldots, n\}$$
$$\sum_{i=1}^{n} \alpha_i y_i = 0.$$

The solution to this problem is $$w = \sum_{i: (x_i, y_i) \in N_s} \alpha_i y_i x_i,$$

where $N_s$ is the set of support vectors. For example the Gaussian kernel, $$K(x_i, x_j) = e^{\frac{-\|x_i - x_j\|}{2\sigma^2}}$$

gives rise to an infinite dimensional space. Neural Networks, Decision Trees, and linear models, and naïve Bayes (in the case that the problem can be recast as a classification problem) are other potential method for performing this prediction although they suffer from the problem that they do not generate estimates of the prediction confidence in a principled manner. Because of this and other technical reasons, the GPR method is the preferred choice.

Figure 2A:
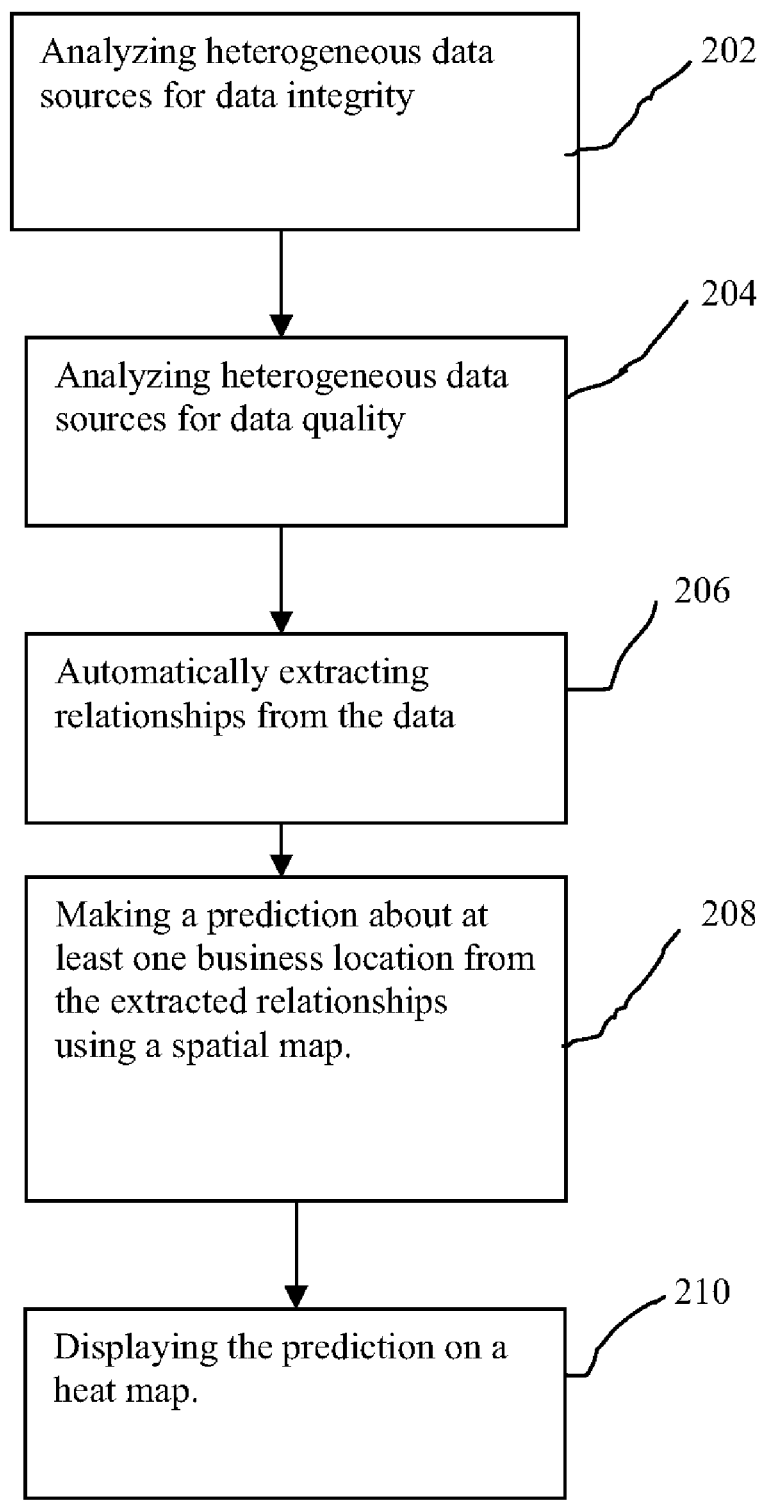
FIG. 2A is a method in accordance with the present invention.

FIG. 2A is a method 200 of selecting optimal business locations. The method 200 includes the step 202 of analyzing heterogeneous data sources for data integrity, the step 204 of analyzing heterogeneous data sources for data quality, the step 206 of automatically extracting relationships from the data, the step 208 of making a prediction about at least one business location from the extracted relationships using a spatial map, and the step 210 of displaying the prediction on a heat map. It can be appreciated that although the present invention may output prediction using a spatial map, including a spatial map having a spatial grid, or a heat map, the predictions output in accordance with the present invention may be in any human or computer-readable form. For example the predictive output may be tabulated for human viewing, or read directly by a computer for use in broader applications.

The step 206 of automatically extracting relationships generates a composite indicator, which includes more than one indicator that is relevant for selecting an optimal business location. The step of automatically extracting relationships, in accordance with one aspect of the invention includes generating a composite indicator, which correlates projected profitability and at least one other indicator. Preferably the at least one other indicator includes one or more of the following: demographic variables, competitor proximity, accessibility, product mix, and comparable customer spending patterns.

Composite indicators may, for example, include revenue per square foot, sales per unit time, and sales per unit time per age bracket of expected customers. Testing the composite indicators against independent data sets may further verify or determine usefulness of the composite indicator. It can be appreciated that any available data may be used in accordance with the present invention and composite indicators may be pre-determined, or learned from the data that is available.

Location accessibility is an indicator that includes parking availability and proximity to well-traveled roads and freeways. However, there are numerous location accessibility indicators available for use, depending on the data.

Demographic variables include prospective customer gender, age, average income, education level, cultural affiliations and ethnicity, for examples. Census data is one source of demographic data. This is not an exhaustive list.

The location of competitors, parking, square footage, rental rates, lease rates, nearby stores, location of other stores, spending patterns of customers, product mix, product locations, product brands, etc. are all useful indicators. The value of any particular indicator, or composite indicator, depends on the type of business that seeks an optimal location. Likewise, given an available location, such indicators can also be used to determine an optimal business type.

Presenting predictions from numerous heterogeneous data sources can be accomplished on a spreadsheet, but often relationships between important data is lost or not recognized when spreadsheet or other non-user-friendly output is used. According to one aspect of the invention, a prediction about business locations is presented on a spatial map having a spatial grid. According to another aspect of the invention, the special grid includes a heat map overlying the spatial grid to indicate preferred regions on the spatial grid where an optimal business location could be situated. Additionally the prediction may be displayed via a set of points on the spatial grid, each point being representative of a business location. Some of the points can include icons to designate a particularly relevant attribute of a business location.

Numerous ways of analyzing data exist. One way suited to automatically finding relationships from heterogeneous data sources, which can be displayed on a spatial grid includes principal component analysis. Another way of extracting relationships includes using correlation analysis. Mutual information from heterogeneous data sources can also be relied upon. A discussion of ways to classify entity (business or customer) data, is presented in published U.S. patent application Ser. No. 09/917,409, entitled System and Method for Comparing Populations of Entities, which is incorporated herein by reference.

Machine learning is applied to facilitate the step of analyzing heterogeneous data sources and making predictions. Optimally, the step of creating and using composite indicators includes learning the composite indicators from the data. Useful composite indicators include revenue per square foot, sales per unit time, and sales per unit time per age bracket. Testing the composite indicators assures usefulness.

Heterogeneous data includes structured data fields reflective of demographics including traffic patterns, real estate costs, and competitive business information. Unstructured data may have a textual component, or may be primarily text. For example, newspaper articles referencing a particular region, shopping center or particular location may be useful in formulating a composite indicator relating to popularity, or customer familiarity, for a possible business location.

Data sources may include data tables and the step of analyzing the heterogeneous data sources for integrity includes determining how well one data table relates to another data table. Additionally the step of analyzing data for quality includes determining whether the contents of a data table have been re-characterized over time. Further, the step of analyzing heterogeneous data sources for quality includes cleansing the contents of a data table. These steps assure that data used for predictions is not misleading.

Data normally includes a data source and data elements. The invention includes attributing a relevancy score for each data source, and attributing a relevancy score for each data element. The step of attributing the relevancy of each data element is computed using linear correlation measures. The relevancy score for each data source is calculated to be a weighted sum of scores of each data element in the data source. The step of attributing the relevancy score of each data element is computed using linear correlation measures.

Figure 2B:
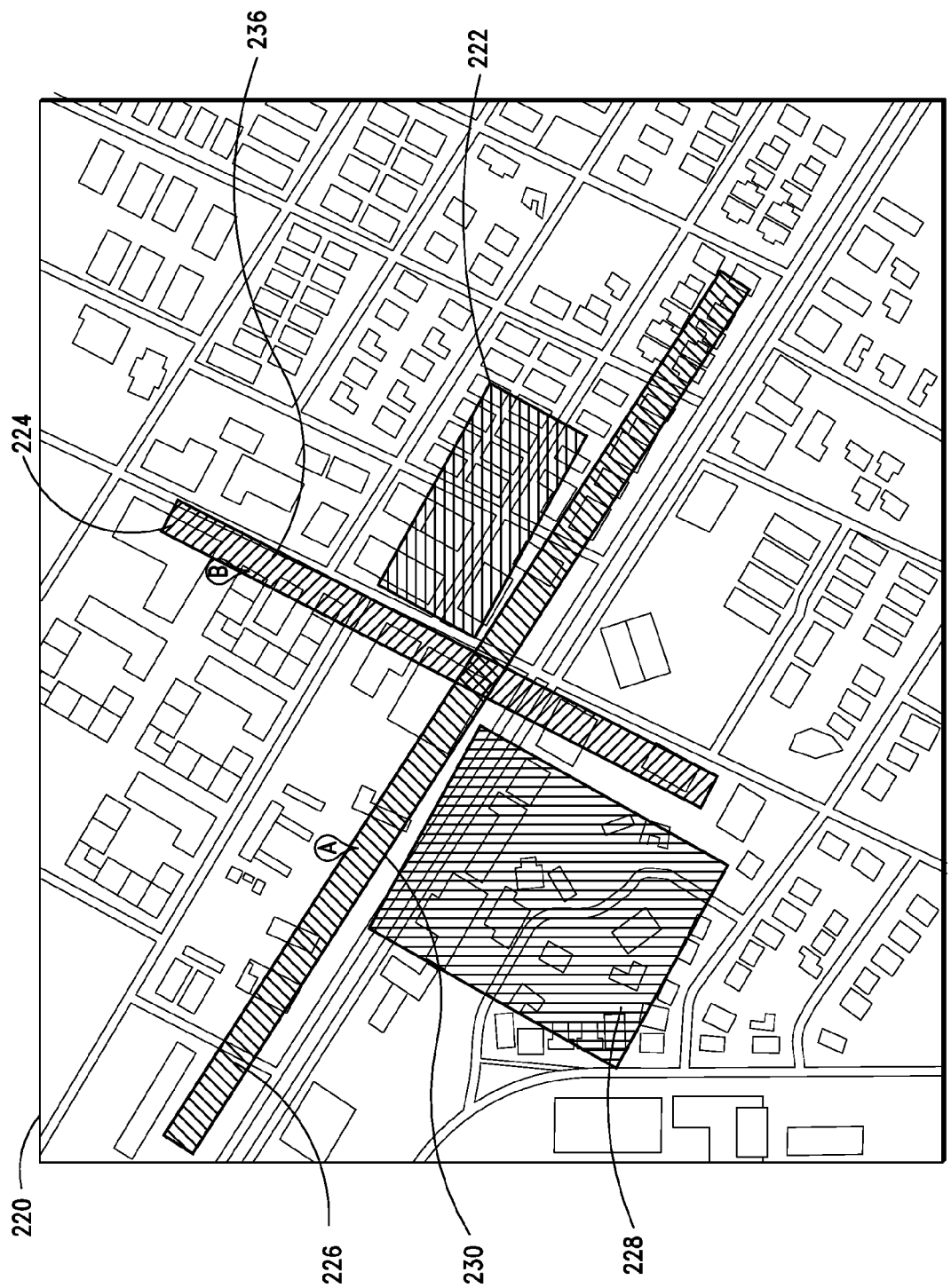
FIG. 2B is a spatial map including a heat map.

FIG. 2B is a spatial map 220. The spatial map 220 is a hybrid map including a satellite view with street names overlaid on street locations. A variety of colored regions 222, 224, 226, 228 define a set of layered heat maps included on the spatial map 220. The regions 222, 224, 226 and 228 are rectangular, but may assume any form of complex polygon, or curved shape. Regions 224 and 226 are colored red, indicating predicted optimal regions for business locations. The regions 222 and 228 are relatively cooler shades of blue indicating less optimal, but possible, regions predicted for business locations. Special callouts 230 and 236 denote particularly desirable addresses based on the predictive output of the algorithm. The translucence of each region map denotes the degree of certitude that the algorithm has for the prediction. Whether a curve, polygon or other shape is used to indicate preferred regions on a heat map, a rank-ordered list of possible business locations can be superimposed on the spatial map, spatial grid, or heat-map to better facilitate business location decision-making.

Figure 3:
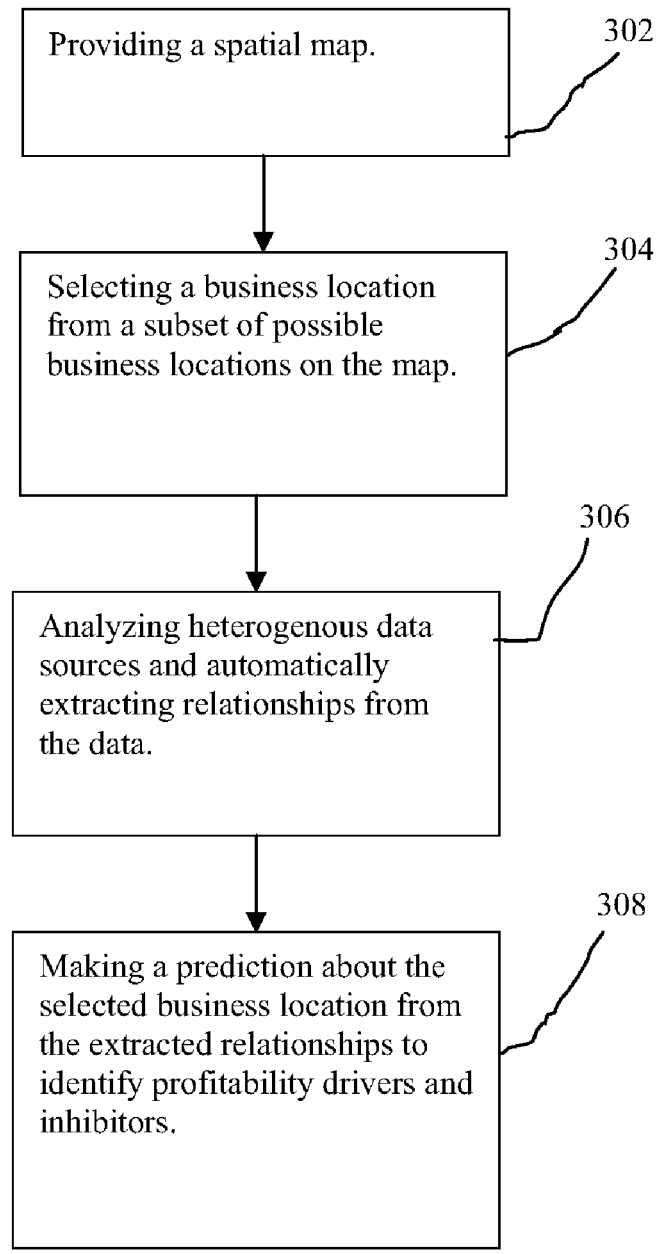
FIG. 3 is a method in accordance with the present invention.

FIG. 3 is a method 300 of making a prediction about business locations on a spatial grid. The method 300 includes the step 302 of providing a spatial map having grid, the step 304 of selecting a business location from a subset of possible business locations on the spatial map, the step 306 of analyzing heterogeneous data sources having data, and automatically extracting relationships from the data, and the step 308 of making a prediction about the selected business location from the extracted relationships to identify profitability drivers and inhibitors.

Figure 4:
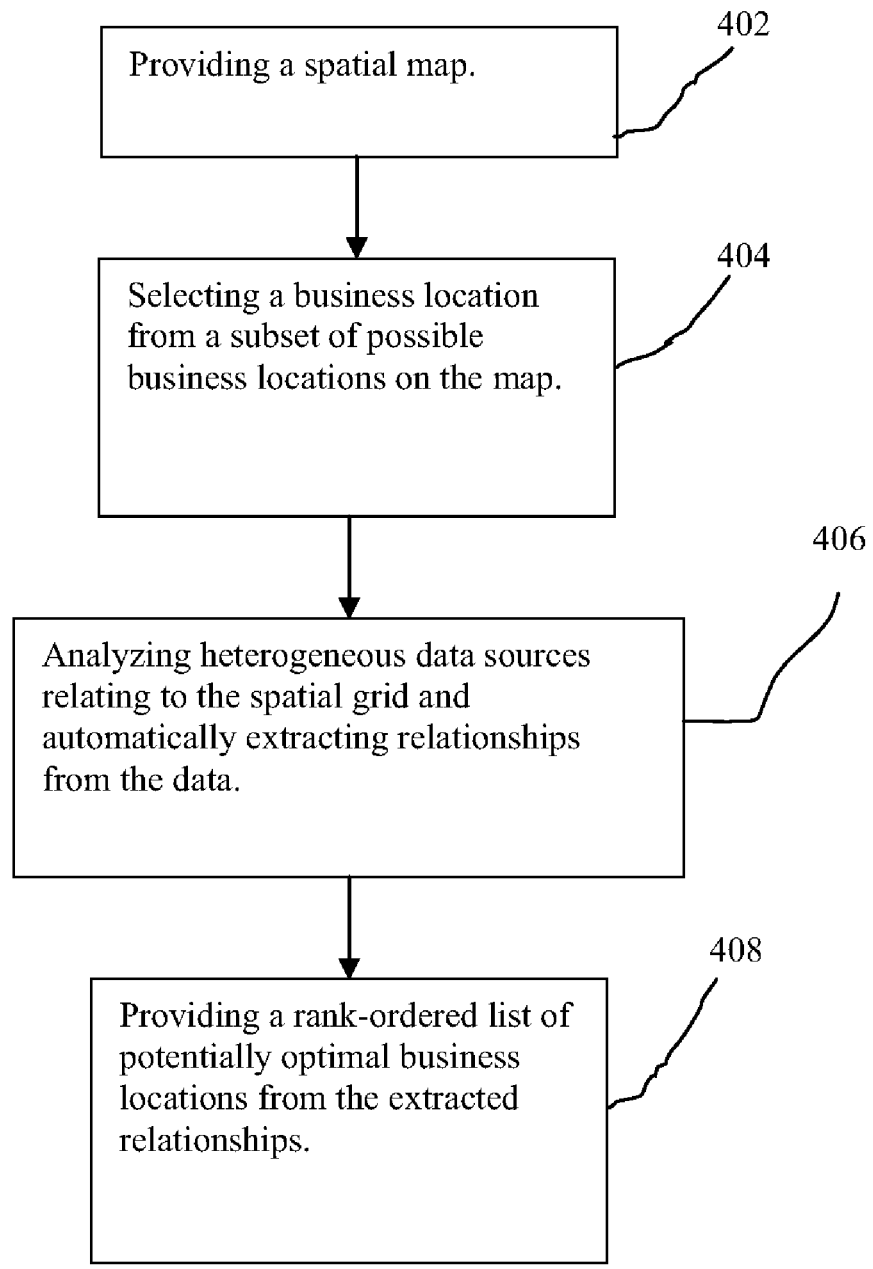
FIG. 4 is a method in accordance with the present invention.

FIG. 4 is a method 400 of providing rank-ordered list of potentially optimal business locations. The method 400 includes the step 402 of providing a spatial map having a grid, the step 404 of selecting a business location from a subset of possible business locations on the grid, the step 406 of analyzing heterogeneous data sources relating to the grid and automatically extracting relationships from the data, and the step 408 of providing a rank-ordered list of potentially optimal business locations from the extracted relationships.

Figure 5:
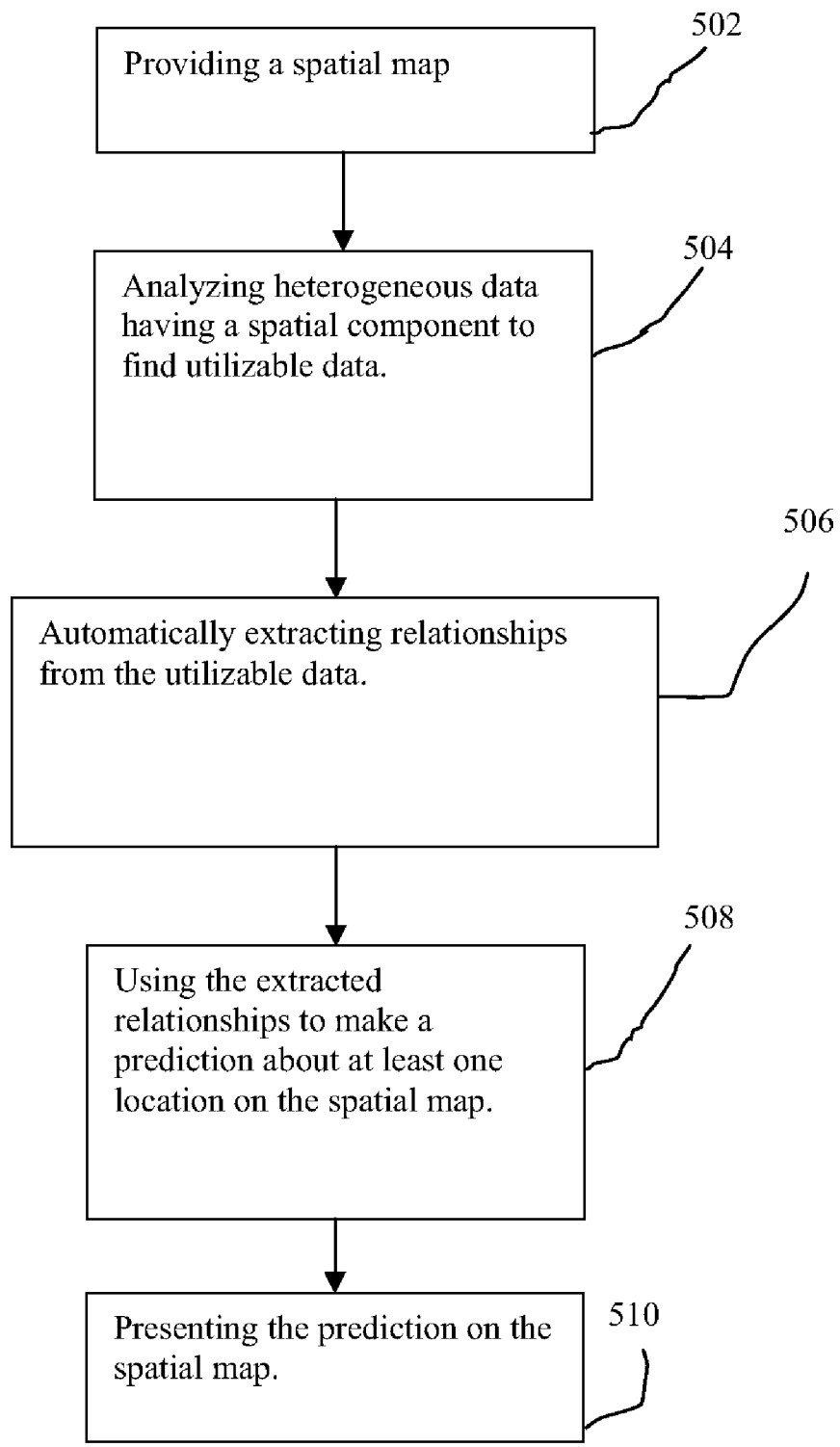
FIG. 5 is a method in accordance with the present invention.

FIG. 5 is a method 500 of presenting a prediction on a spatial map. The method 500 includes the step 502 of providing a spatial map. The step 504 of analyzing heterogeneous data having a spatial component to find utilizable data follows. Next, the step 506 automatically extracts relationships from the utilizable data, then the step 508 uses the extracted relationships to make a prediction about at least one location on the spatial map. The step 510 presents the prediction on the spatial map.

Figure 6:
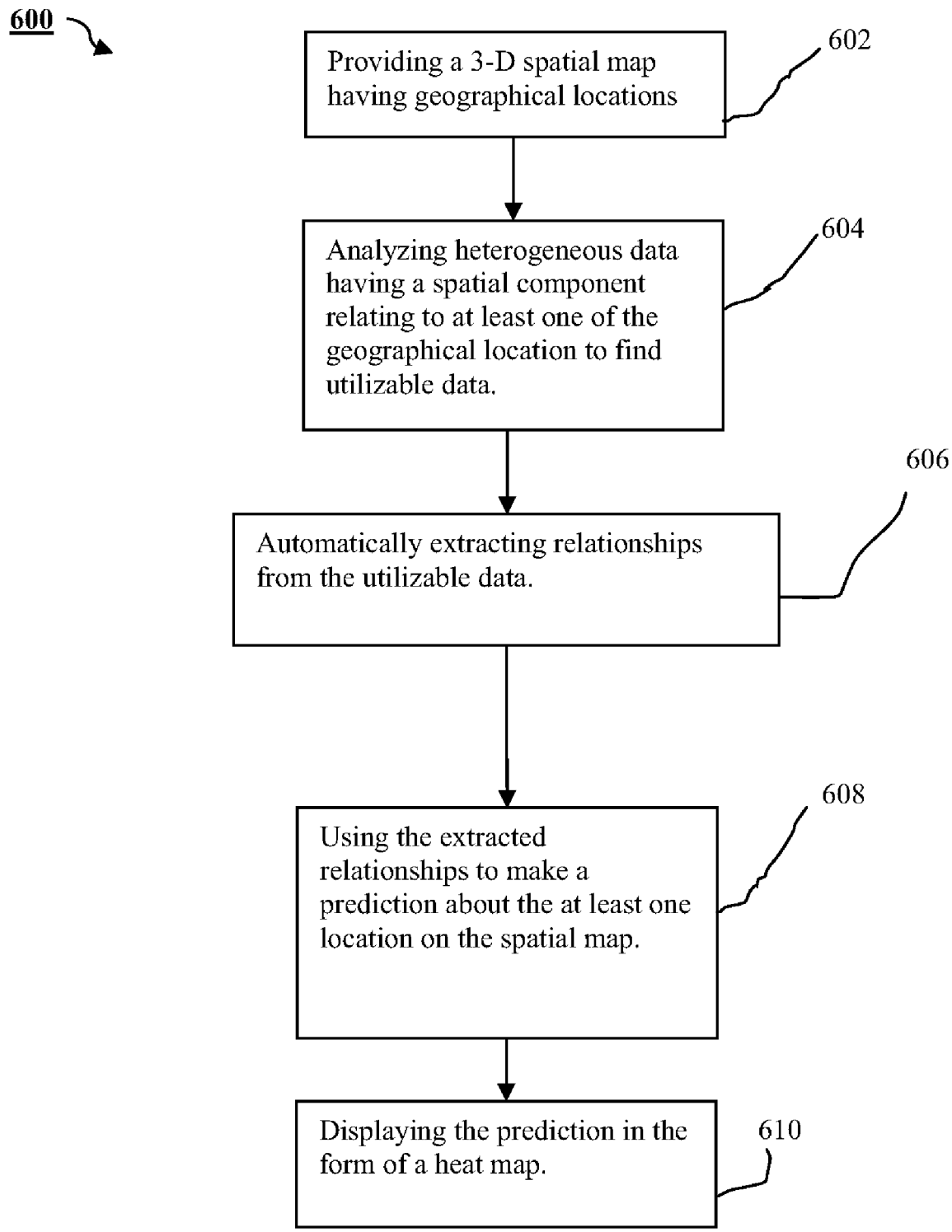
FIG. 6 is a method in accordance with the present invention.

FIG. 6 shows a method 600 for displaying predictions on a spatial map. The method 600 includes the step 602 providing a spatial map having geographical locations, the step 604 of analyzing heterogeneous data having a spatial component relating to at least one of the geographical locations to find utilizable data, the step 606 of extracting relationships from the utilizable data, the step 608 of using the extracted relationships to make a prediction about the at least one geographical location and the step 610 of displaying the prediction in the form of a heat map, wherein the prediction correlates to the at least one geographical location.

The step 602 of providing a spatial map includes providing a three dimensional topographic map as a graphical projection, in a perspective view. The spatial map is interactive in accordance to one aspect of the invention, so that the angle of the perspective view is variable in accordance with a user's preference. Accordingly, it can be appreciated that any useful graphical projection can replace the perspective view as drawn herein. For example, a 3-D map can be shown as any form of graphical projection including an oblique projection or orthographic projection. It is preferred that the graphical projection be interactive, and have a selectively adjustable angle to enable a user to display any angle and view that reveals the valued aspects of the three dimensional character of the spatial map. For example, a user could choose to display an isometric view where an isometric view is useful for visualizing the three dimensional character of the spatial map, or where interacting with an isometric view is deemed useful.

The step 610 of displaying includes enabling a user to select a prediction to display. Accordingly, when implemented in software and using a user interface, the present invention enables a user to select which prediction, geographical region, and relationships (where applicable) to display.

The step 610 of displaying can be accomplished in a myriad of ways. For example, the step 610 in accordance with one aspect of the invention includes displaying a three dimensional heat map having contours reflective of a first data, and colors overlying the respective contours where the colors are reflective of a second data. The first and second data being reflective of a common geographical location on the spatial map.

The step 610 of displaying the prediction is accomplished in a number of ways. One way is that a heat map is displayed overlying the three dimensional topographic map. In another embodiment of the invention, the heat map is displayed overlying a two dimensional topographic map having contour lines.

Another variant of the invention is to display the heat map directly under a three dimensional topographic map. "Under" in this context means extending in a perpendicular direction towards the earth relative to the surface of the ground. In another embodiment of the invention, the heat map is displayed under a two dimensional topographic map having contour lines.

Yet another variant of the invention is to display the heat map directly over a three dimensional topographic map. "Over" in this context means extending in a perpendicular direction away from the earth relative to the surface of the ground. In another embodiment of the invention, the heat map is displayed over a two dimensional topographic map having contour lines.

In an embodiment of the invention, the prediction is time-dependent and step 610 of displaying the prediction includes simultaneously presenting more than one heat map where each heat map is indicative of a particular time.

In another embodiment of the invention, the prediction is time-dependent and step 610 of displaying the prediction includes sequentially presenting more than one heat map where each heat map is indicative of a particular time. In a variation of this embodiment, the prediction is presented as a sequence of video frames.

Figure 7A:
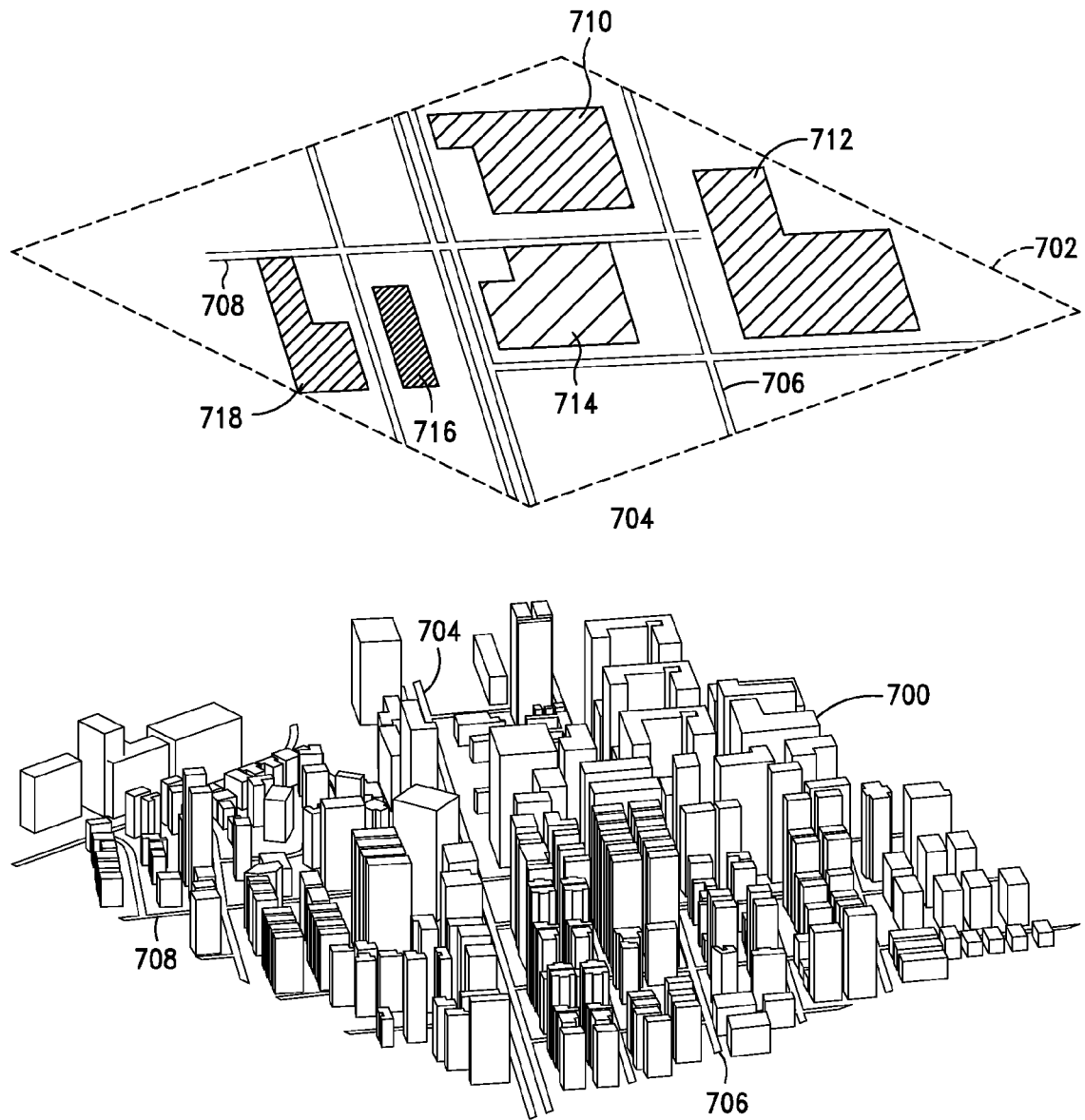
FIG. 7A is a perspective view of a cityscape and an overlying heat map.

FIG. 7A is a perspective view of a spatial map 700 including a heat map 702. The spatial map 700 displays a cityscape in three dimensions (3-D). The spatial map 700 is interactive, enabling a user to pan, rotate, zoom and otherwise adjustably view the spatial map 700.

Displaying a 3-D spatial map 702 can be accomplished by many forms of graphical projection including with an oblique projection or orthographic projection. It is preferred that the graphical projection be interactive. An orthographic projection, sometimes termed an orthogonal projection, is one in which a rectangular object, projected on a plane, shows three faces including isometric, dimetric and trimetric projections.

A perspective view is a form of oblique projection. Mathematically, an oblique projection of a point (x,y,z) on the xy-plane gives (x+az,y+bz,0). The constants a and b uniquely specify a parallel projection. When a=b=0, the projection is said to be orthographic or orthogonal. Otherwise, it is oblique. The constants a and b are not necessarily inferior to unity, and as a consequence lengths measured on an oblique projection may be either larger or shorter than they were in space. In a general oblique projection, spheres of the space are projected as ellipses on the drawing plane, and not as circles as you would expect them from an orthogonal projection.

The heat map 702 shows regions in the form of polygons 710, 712, 714, 716 and 718. The heat map 702, in particular, each polygon 710, 712, 714, 716 and 718 has distinct markings and correlates to a particular region of the spatial map 700. The distinct markings in this example are colors, but it can be appreciated that the distinct markings can use shading, cross-hatching or other indicia to indicate something about that particular region. It can also be appreciated that there are many features of a spatial map that can correlate with a heat map 702.

In this example, the polygons 710, 712, 714, 716 and 718 correlate with particular city blocks. The polygons, in other examples, can alternatively correlate with particular buildings, streets, lots, or generalized neighborhoods in accordance with the present invention. In other additional examples, the polygons can correlate with features of undeveloped land. One feature of undeveloped land is natural resource availability including water availability, lumber productivity as well as wind and solar availability.

Preferably, the heat map 700 makes a prediction about a particular region within the heat map 700. Examples of useful predictions include future occupancy rates, rents, growth measures, and future applicability of the region for a particular purpose. The heat map 700 may also be adapted to reflect various composite indicators. In the case of undeveloped land, heat maps can predict the probability of natural resource availability, such as oil, gas, wind, water, and sun. Heat maps can also indicate probable future real estate values.

The heat map 702 includes at least one way of correlating the heat map 702 to the spatial map 700. In this example, the heat map 702 re-displays a portion of the spatial map 700. In particular some major streets 704, 706 and 708 are indicated on the heat map in order to correlate the polygons with particular locations on the underlying spatial map 700. There are other ways to correlate a heat map with a spatial map that can be appreciated, depending on the context. For example, major geographical features can be re-displayed including rivers, roads, mountains and bridges.

While this figure displays a single heat map, multiple heat maps can be displayed selectively by a user. This selective display of heat maps can be sequenced, as in a video clip to show changes in the heat map (and any underlying prediction) over time. Also, several heat maps can simultaneously be displayed by a user and positioned relative to the spatial map 706.

Figure 7B:
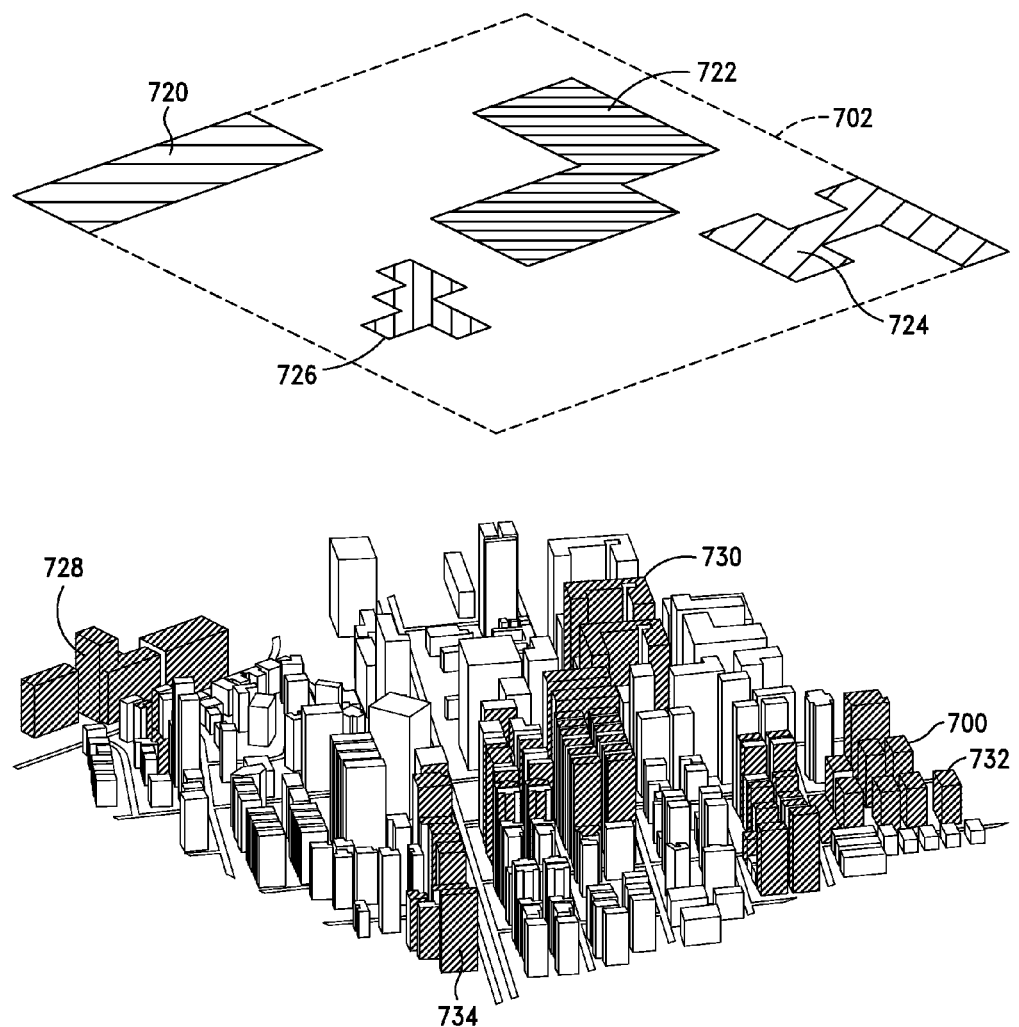
FIG. 7B is a perspective view of a cityscape and an overlying heat map.

FIG. 7B is the heat map 702 overlying a spatial map 700. The heat map 702 correlates to the spatial map 700. The spatial map 700 includes shadows 728, 730, 732 and 734, which cover various regions on the spatial map 700. The shadows 728, 730, 732 and 734 are shown uniform in color, shade and cross-hatched marking, however it can be appreciated that the shadows 728, 730, 732 and 734 can also be uniquely colored, shaded, cross-hatched, or otherwise marked to more clearly correlate the spatial map 700 and the heat map 702. In this example, the various polygons 720, 722, 724 and 726 correlate with spatial map 700 shadows 728, 730, 732 and 734, respectively.

Figure 8:
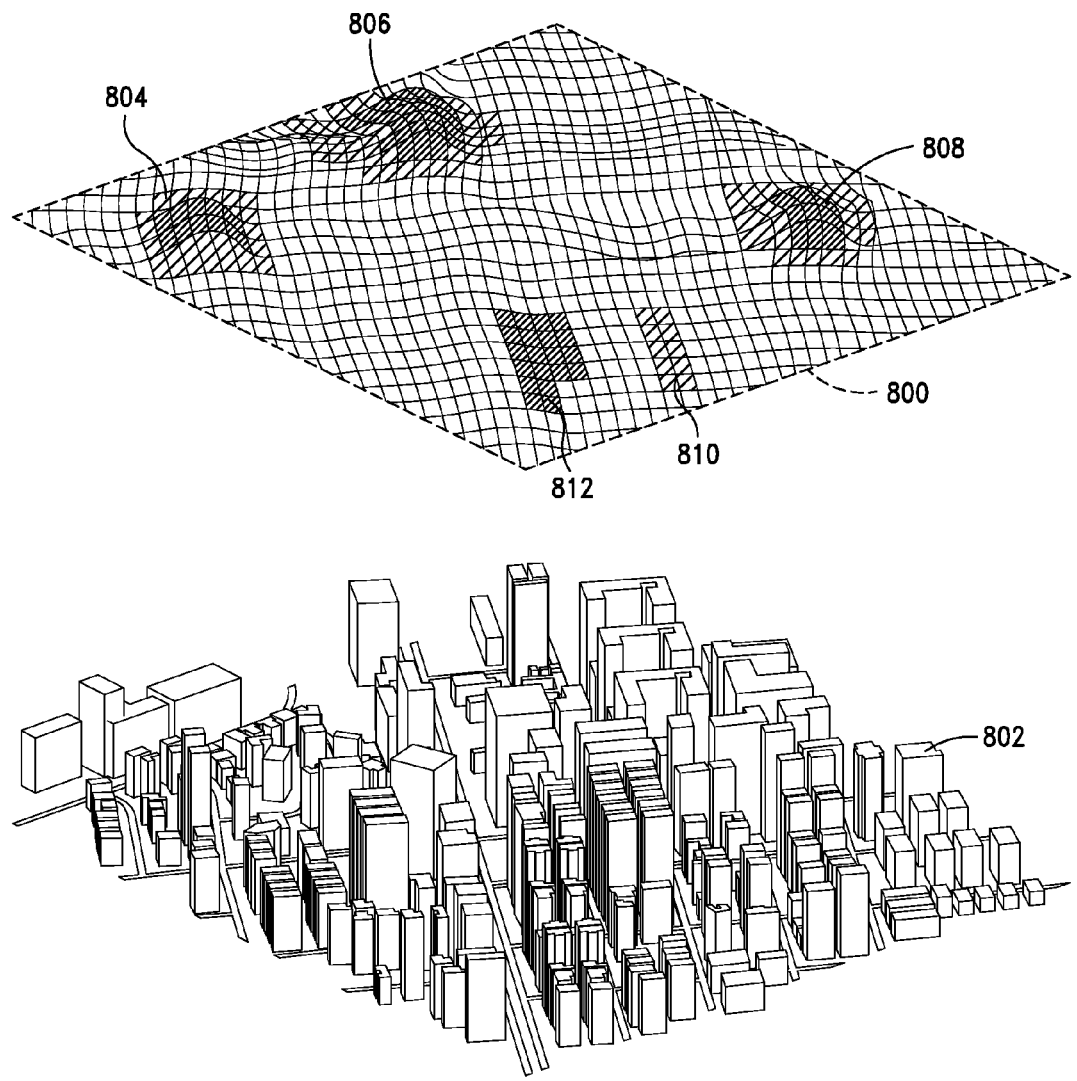
FIG. 8 is a perspective view of a cityscape and an overlying 3-D heat map.

FIG. 8 is a three dimensional (3-D) heat map 800 overlying a spatial map 802. The heat map 800 has a rolling topography. The heat map 800 includes polygons 804, 806, 808, 810 and 812 that make predictions about various regions on the spatial map 802. The heat map 800 includes grid lines to aid in displaying the three dimensional nature of the heat map 800. It can be appreciated that other ways besides grid lines may be used to duly display a 3-D heat map in accordance with the present invention.

Figure 9:
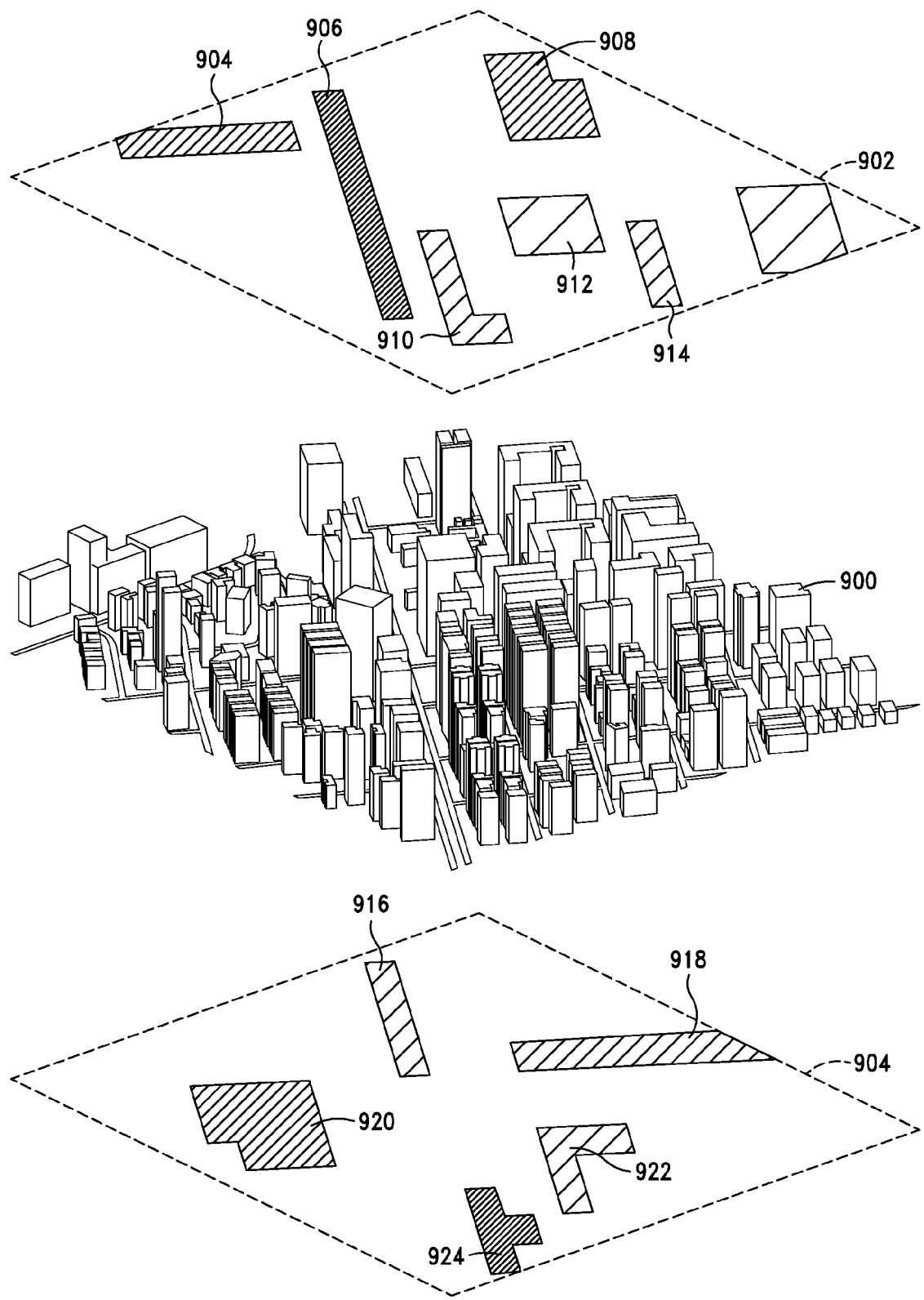
FIG. 9 is a perspective view of a cityscape and an overlying and underlying heat map.

The polygons 804, 806, 808, 810 and 812 are true polygons, but appear to have curved peripheral lines due to the rolling topography of the heat map 800, thus demonstrating that numerous polygons, if made small enough, and placed on a rolling topography, can be appear to create curved shapes. It can also be appreciated that curved shapes can be aptly substituted for the polygons of the present invention. Accordingly, the term "polygon" as used herein should include polygons of such fine granularity an appearance to appear to generate curved surfaces, and actually curved shapes that may be displayed FIG. 9 is a spatial map 900 including an overlying heat map 902 and an underlying heat map 904. Each heat map 902 and 904 includes polygons 904, 906, 908, 910, 912, 914, 916 918, 920, 922, and 924 of distinct color to make numerous predictions about particular regions on the spatial map 900. Each heat map 902 and 904 displays a different indicator associated with that heat map. The polygons are colored to indicate the value of the associated indicator. The heat maps correlate with the spatial map 900, which is shown in a perspective view and in 3-D.

While the present invention is disclosed in terms of exemplary embodiments, it can be appreciated that the methods of the present invention can be practiced in a number of ways as defined by the scope of the appended claims. For example, a 3-D map can be shown as any form of graphical projection including a perspective view, oblique projection or orthographic projection. It is preferred that the graphical projection be interactive. Additionally various features of the system of the present invention can be modified in a myriad of ways to achieve the goals of the invention.

The invention claimed is:

1. A method for displaying predictions on a spatial map, comprising the steps of:
   providing a system including a computer programmed with software, a display means in communication with the computer for displaying a spatial map, and at least one database in communication with the computer, the database stores data including heterogeneous data having a spatial component, the spatial component being representative of geographical locations;
   analyzing heterogeneous data having a spatial component relating to at least one of the geographical locations to find utilizable data;
   extracting relationships from the utilizable data;
   using the extracted relationships to make a prediction about the at least one geographical location;
   displaying the prediction in the form of a three dimensional heat map, wherein the prediction correlates to the at least one geographical location.

2. A method as set forth in claim 1, wherein the step of displaying includes enabling a user to select a prediction to display.

3. A method as set forth in claim 1, wherein the step of providing a spatial component includes providing a three dimensional topographic map in an oblique view.

4. A method as set forth in claim 3, wherein and the step of displaying the prediction includes displaying a heat map on the three dimensional topographic map.

5. A method as set forth in claim 3, wherein and the step of displaying the prediction includes displaying a heat map over the three dimensional topographic map.

6. A method as set forth in claim 3, wherein and the step of displaying the prediction includes displaying a heat map under the three dimensional topographic map.

7. A method as set forth in claim 1, wherein the prediction is time-dependent and step of displaying the prediction includes simultaneously presenting more than one heat map where each heat map is indicative of a particular time.

8. A method as set forth in claim 1, wherein the prediction is time-dependent and step of displaying the prediction includes sequentially presenting more than one heat map where each heat map is indicative of a particular time.

9. A method as set forth in claim 8, wherein the prediction is presented as a sequence of video frames.

10. A system for making predictions on a spatial map, comprising:
    a data analyzer including a computer programmed with software;
    user interface in communication with the data analyzer for displaying a three dimensional spatial map;
    databases in communication with the data analyzer, the databases include heterogeneous data having a spatial component;
    the analyzer analyzes the heterogeneous data to find utilizable data, extracts relationships from the utilizable data and uses the extracted relationships to make a prediction about at least one location on the spatial map, and
    the interface displays the prediction on the three dimensional spatial map.

11. A system as set forth in claim 10, wherein the interface has colored output to displays the prediction in the form of a heat map having more than one color.

12. A system as set forth in claim 10, wherein the interface displays the prediction in the form of a three dimensional heat map that overlies the spatial map.

13. A system as set forth in claim 10, wherein the interface displays the three dimensional map as an oblique projection.

14. A system as set forth in claim 10, wherein the interface displays the three dimensional map as an orthographic projection.

15. A system as set forth in claim 10, wherein the prediction varies with time, and the interface simultaneously displays more than one time-dependent prediction.

16. A system as set forth in claim 10, wherein the prediction varies with time, and the interface simultaneously displays more than one time-dependent prediction, each time-dependent prediction is displayed as a topography that is semi-transparent and having a unique color, tone or hue.

17. A system as set forth in claim 10, wherein the prediction varies with time, and the prediction is displayed as a sequence of video frames.

18. A system as set forth in claim 10, wherein the analyzer selectively makes more than one prediction and the interface simultaneously presents each prediction.

19. A system as set forth in claim 10, wherein the analyzer makes more than one prediction, and the interface enables a user to select desired predictions, the interface displays the desired predictions.

* * * * *